United States Patent
Hamernik

(10) Patent No.: US 10,177,651 B2
(45) Date of Patent: Jan. 8, 2019

(54) SYSTEM FOR CONTROLLING INRUSH CURRENT TO ELIMINATE INRUSH OVERCURRENT TO ELECTRICAL EQUIPMENT

(71) Applicant: MERCURY MAGNETICS, INC., Chatsworth, CA (US)

(72) Inventor: Sergio H. Hamernik, Chatsworth, CA (US)

(73) Assignee: MERCURY MAGNETICS, INC., Chatsworth, CA (US)

( * ) Notice: Subject to any disclaimer, the term of this patent is extended or adjusted under 35 U.S.C. 154(b) by 0 days.

(21) Appl. No.: 15/849,095

(22) Filed: Dec. 20, 2017

(65) Prior Publication Data

US 2018/0175612 A1    Jun. 21, 2018

Related U.S. Application Data

(60) Provisional application No. 62/436,614, filed on Dec. 20, 2016.

(51) Int. Cl.
*H02M 1/36* (2007.01)
*G05F 1/573* (2006.01)
*H02M 1/00* (2006.01)

(52) U.S. Cl.
CPC .............. *H02M 1/36* (2013.01); *G05F 1/573* (2013.01); *H02M 2001/0009* (2013.01)

(58) Field of Classification Search
CPC .................. H02M 1/36; H02M 2001/0009

USPC .......................................................... 323/908
See application file for complete search history.

(56) References Cited

U.S. PATENT DOCUMENTS

| 3,859,591 | A | * | 1/1975 | Saunders | G05F 1/445 |
| | | | | | 323/235 |
| 4,672,301 | A | * | 6/1987 | Westfall | H02M 7/797 |
| | | | | | 323/235 |
| RE33,184 | E | * | 3/1990 | Westfall | G05F 1/455 |
| | | | | | 323/235 |
| 9,496,702 | B2 | * | 11/2016 | Dong | H02H 3/16 |
| 2010/0283492 | A1 | * | 11/2010 | Growcock | G01N 33/2823 |
| | | | | | 324/724 |
| 2017/0214314 | A1 | * | 7/2017 | Jitaru | H02M 1/4208 |
| 2018/0175612 | A1 | * | 6/2018 | Hamernik | H02H 9/001 |

* cited by examiner

*Primary Examiner* — Kyle J Moody

(57) ABSTRACT

A system for eliminating inrush current to electrical equipment while providing a user increased control is proposed. The user of the device is able to control the speed of the ramp up of alternating current (AC) to the electrical equipment, regardless of the load. When the ramp up meets its full power, the device of the present system will disable itself while allowing power to flow directly to the electrical equipment. The present system allows for user controlled delay time as well as microcontroller controlled current sensing. Further, the device shuts off power to the electrical equipment if an overdraw of current (e.g. a short circuit in an amplifier) is detected. This feature may be an early warning, indicating a need for technical repair before irrevocable damage is done to the components of the electrical equipment.

20 Claims, 4 Drawing Sheets

SYSTEM FOR CONTROLLING INRUSH CURRENT TO ELIMINATE INRUSH OVERCURRENT TO ELECTRICAL EQUIPMENT

CROSS REFERENCE

This application claims priority to U.S. patent application Ser. No. 62/436,614, filed Dec. 20, 2016, the specification(s) of which is/are incorporated herein in their entirety by reference.

FIELD OF THE INVENTION

The present invention relates to eliminating inrush current to electrical equipment, more specifically, a system for providing control of a ramp rate for electrical equipment is proposed.

BACKGROUND OF THE INVENTION

It is typical for electrical equipment to draw an input surge current ("inrush current") when initially turned on. This inrush current may be several times the normal full load current of the equipment and may last for a few power cycles. Damage to the electrical equipment may result. For example, in the case of audio amplifiers, internal components such as transistors, diodes, electrolytic capacitors and filament/heaters that are typically found in vacuum tubes may overheat and/or malfunction. The device of the present system eliminates the chance that this phenomenon might occur.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

Presently, counteractive measures to prevent inrush current are not widely practiced. A solution employed by a small percentage of practitioners is the use of a component such as a thermistor. A thermistor is a device whose internal resistance changes with heat. This internal resistance remains in the circuit and contributes to input line loss to the electrical equipment. Additionally, demonstrated use of the thermistor has shown that its handling of inrush current is inconsistent at best.

The present invention features a device that solves the inrush current problem by incorporating a microcontroller controlled ramp rate and duration circuit (integrated into the microcontroller). This present invention demonstrates the complexity of hybridizing multiple technologies and components like hardware and software, and is not compatible with many other power supplies such as: class "D" digital circuits, non-linear, self-sensing, soft starting and partial voltage trickle, instant on supplies. Also cost, size, complexity defeats stand by feature with some devices. This technology monitors and adjusts both voltage and current independently of input line source and output lead with accuracy and consistency, providing reliable overload protection for the connected device component trending toward failure with increasing current consumption and "component aging". Ordinary skilled persons were surprised at how easy the circuit device worked and how easy it was to operate. They couldn't destroy the circuit or fool the sensing. The user of the device will be able to control the speed of the ramp up of alternating current (AC) supplied to the electrical equipment, regardless of the load. When the ramp up meets its full power, the device of the present invention will disable itself while allowing power to flow directly to the electrical equipment.

Unlike the thermistor or other currently employed solutions to the problem of the inrush current, the device of the present invention allows for user controlled delay time and ramp rate of AC voltage, as well as microcontroller controlled current sensing. Further, the device shuts off power to the electrical equipment if an overdraw of current (e.g. a short circuit in an amplifier) is detected. This feature may be an early warning, indicating a need for technical repair before irrevocable damage is done to the components of the electrical equipment.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 3:
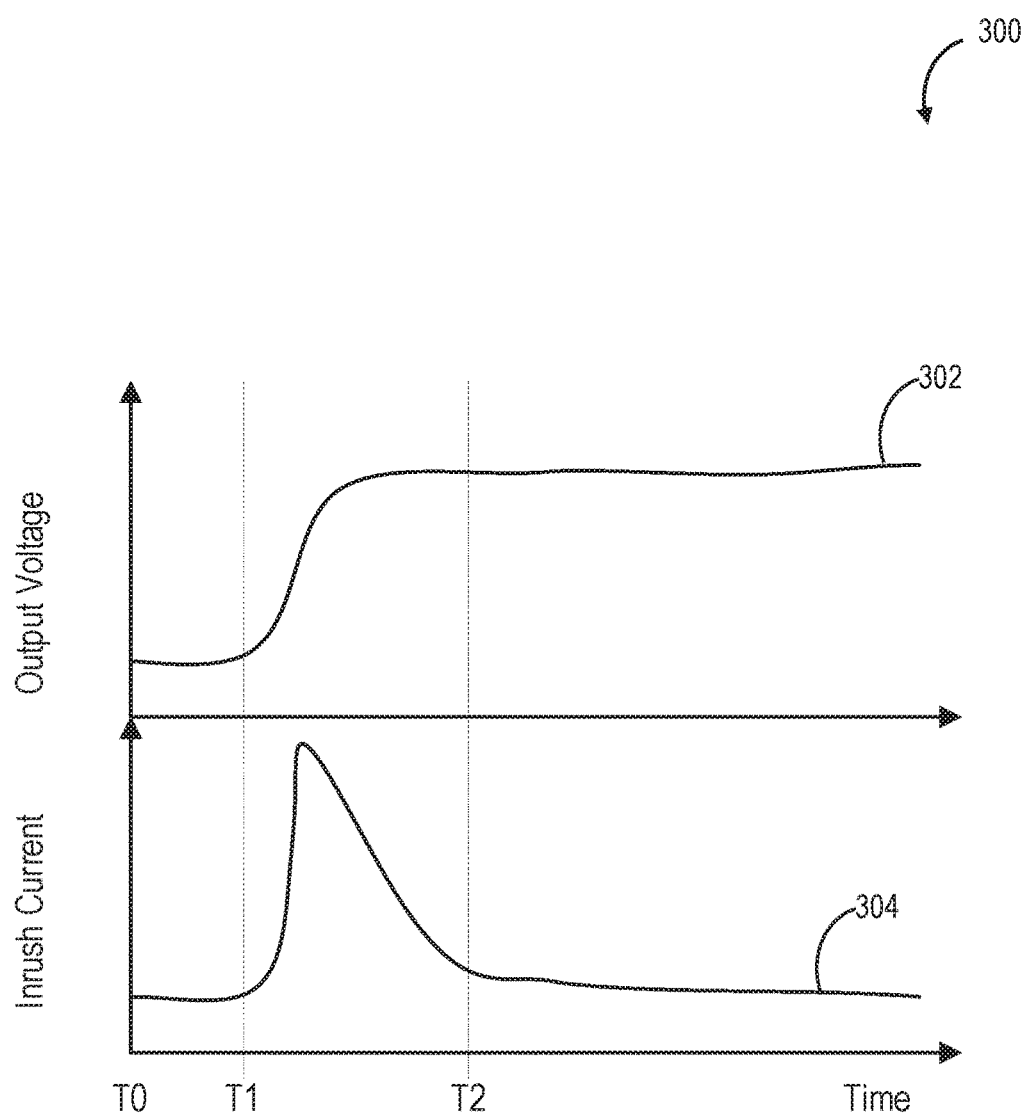
FIG. 3 shows a graph illustrating an example relationship between an output voltage and an inrush current.

Following is a list of elements corresponding to a particular element referred to herein:
100 device
101 microcontroller
103 solid state relay
105 duration circuit
107 control knob
109 current detection circuit
111 electrical equipment or load
113 AC power source Turning to FIG. 3 plot 300 illustrates an example relationship between an output voltage (302) and an inrush current (304). At time T1, an electrical equipment is turned ON. Between time T1 and T2, a power supply of the electrical equipment will ramp up to the regulated voltage. As the voltage (plot 302) increases, a transient current called the inrush current (plot 304) flows into the electrical equipment. The inrush current (plot 304) is the current drawn by the electrical equipment when power is first applied. As such, the inrush current is greater than the normal operating current of the electrical equipment, and the ratio can vary from a few percent up to many times the operating current. As an example, a circuit that normally draws 1A from the mains may easily draw 50 to 100 times that when power is applied, depending on the supply voltage, wiring and other factors. This sudden or transient inrush current may cause damage to the components in the electrical equipment, and may further degrade the electrical equipment. The present invention includes a device that is operated to reduce the inrush current and thus reduce damage to the electrical equipment.

Figure 1:
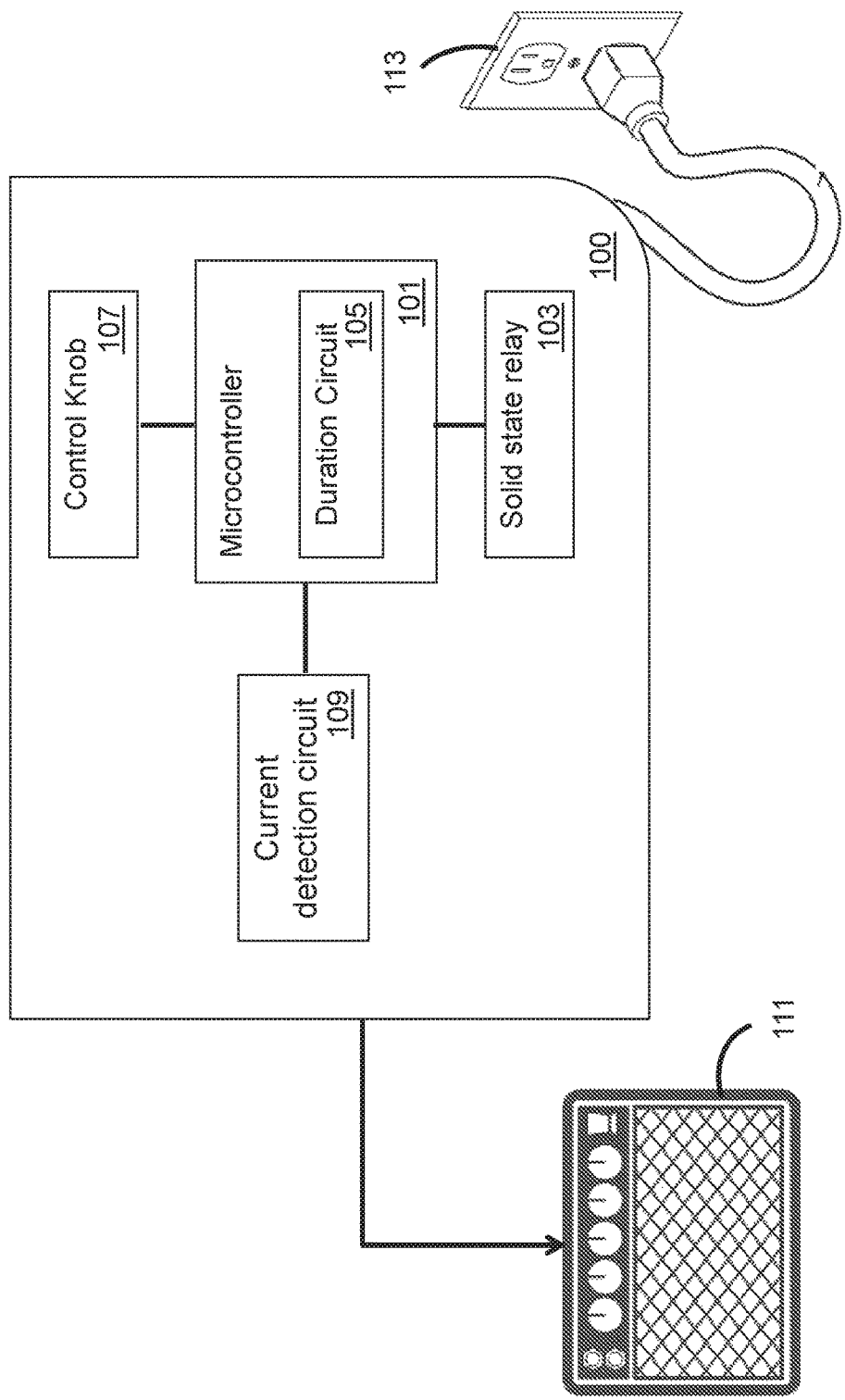
FIG. 1 shows a diagrammatic representation of the present system having a device operatively connected to an electrical equipment.
Figure 2:
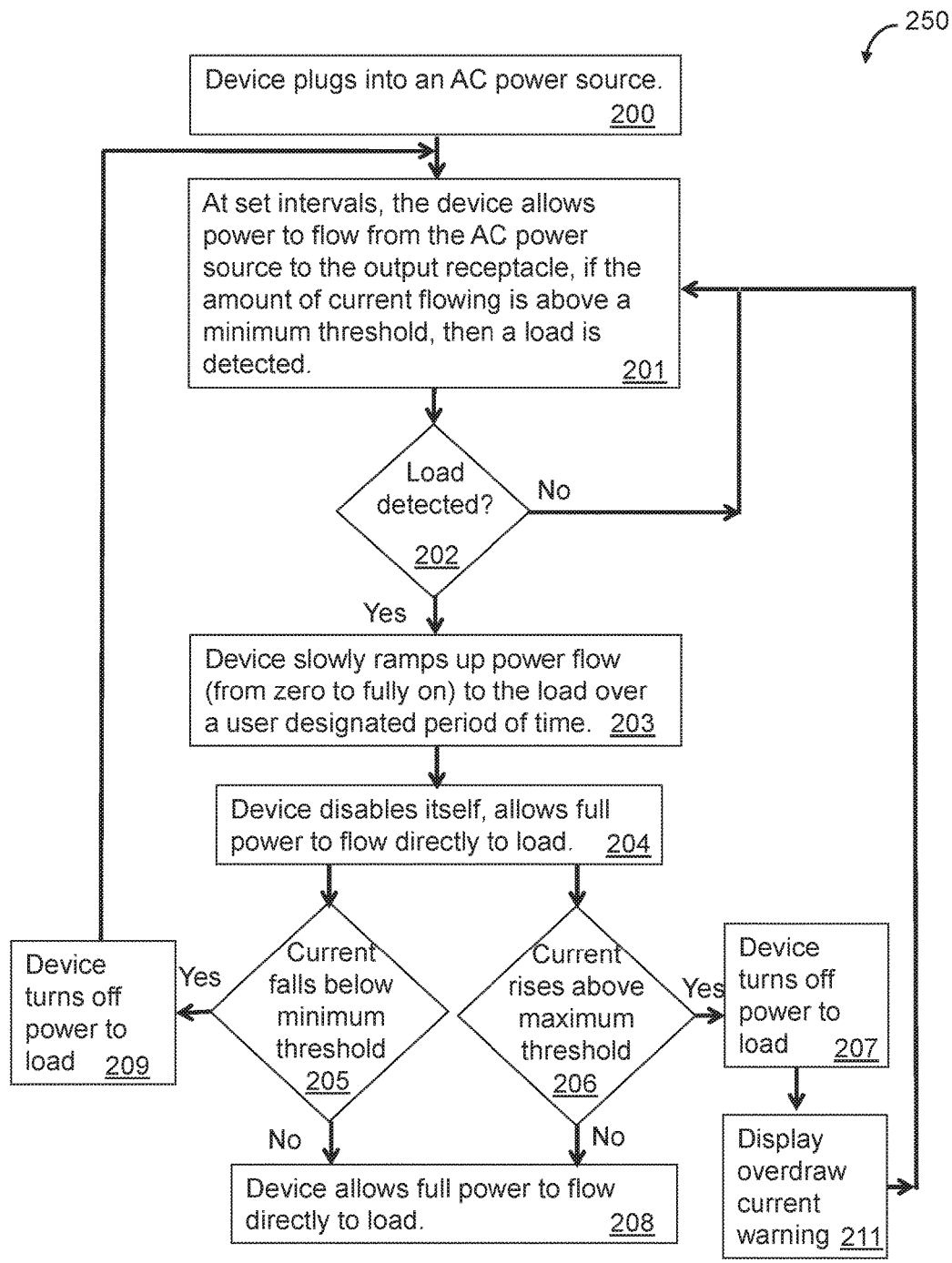
FIG. 2 shows a flowchart describing an exemplary method for controlling power flow to the electrical equipment using the device of the present system.
Figure 4:
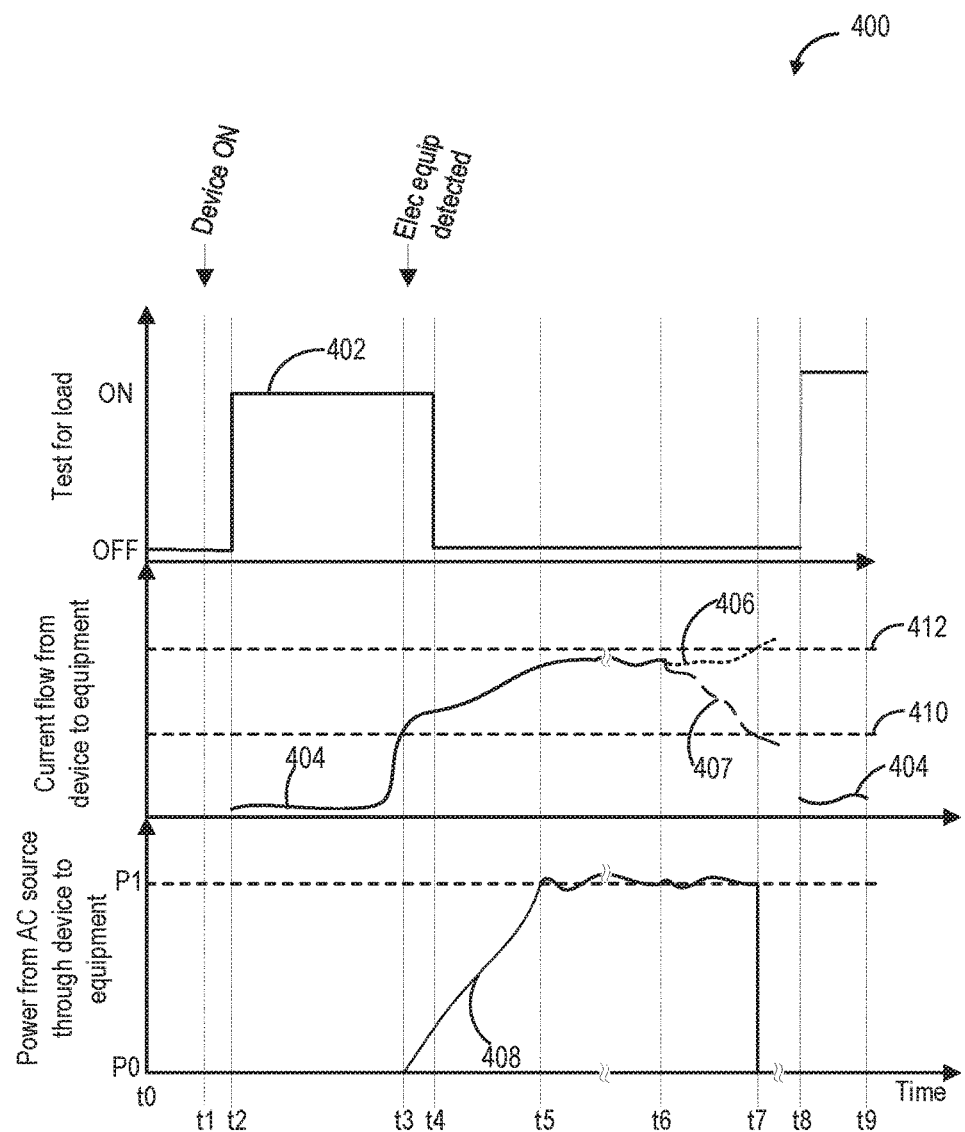
FIG. 4 shows an example operation of the device to reduce the inrush current flowing into the electrical equipment.

Referring now to FIGS. 1, 2, and 4, the present invention features a system for controlling power flow to electrical equipment (111) for effective elimination of an inrush current when the electrical equipment (111) is initially turned on. The system may comprise a device (100) having a microcontroller (101) configured to send a signal to turn off or turn on the power flow to the electrical equipment (111) via a solid state relay (103). In further embodiments, the device (100) may also comprise a duration circuit (105) and a control knob (107) operatively connected to the microcontroller (101). The duration circuit The duration employs clock circuitry with user adjustable time span with end of cycle auto-reset or auto bypass. Timespan determines cycle duration, ramp up angle and rate. (105) may be integrated into the microcontroller (101) and provide timing regulation for the device (100). Also, a user may designate a time period over which the device (100) ramps up the power flow to the electrical equipment (111) from zero to fully on via the control knob (107) (where the time period is regulated by the duration circuit (105).

In another embodiment, the device (100) may be operatively connected to the electrical equipment (111) via an output receptacle and plug into an AC power source (113).

In some embodiments, the system may further comprise a current detection circuit (109) operatively connected to the microcontroller (101). A measurement of the current flowing from the device (100) to the electrical equipment (111) is acquired by the current detection circuit (109).

Consistent with previous embodiments, the electrical equipment (111) is powered on after the device (100) is powered on and the device may synchronize its operation to the line rate of the AC power source (for example, 60 Hz or 50 Hz). After a few seconds, the device (100) begins to test for the presence of the electrical equipment (111) ("load"). Testing for the load (111) is done within a first time interval (e.g. 1.5 seconds). During this time, the microcontroller (101) sends a signal to the solid state relay (103) to allow power to flow from the AC power source (113) through the device (100) to the electrical equipment (111). The amount of current flowing to the electrical equipment (111) is then measured by the current detection circuit (109). If the measured amount of current is above a minimum current threshold, then the device (100) has detected the electrical equipment (111). If the measured current is below the minimum current threshold then either no load (111) is present or the load (111) is manually powered off. For the case where no load (111) is detected, the power flow to the electrical equipment (111) is shut off by the device (100) for a time length equal to the first time interval. Afterwards, power flow to the electrical device is again allowed for a period of time equal to the first time interval and testing for the presence of a load (111) occurs again (i.e., the amount of current flowing to the electrical device is again measured and compared to the minimum current threshold). Thus, a cycle of testing for a load is established (i.e. a periodic checking for the presence of the electrical equipment (111) by the device (100). In further embodiments, the first time interval is regulated by the duration circuit (105).

In additional embodiments, once the electrical equipment (111) is detected, the cycle of testing is suspended and the device (100) ramps up power flow from the AC power source (113) to the electrical equipment (111) over a second time interval. This time interval may be set by a user via the adjustable control knob (107). The device then ramps up power flow to the electrical equipment (111) from zero to fully on in gradually increasing increments that span the second time interval. In this way, a steady increase in power flow to the electrical equipment (100) is provided, thus eliminating an occurrence of inrush current. Once power flow from the AC power source (113) is fully supplied to the electrical equipment (111), the microcontroller (101) disables the device (100) and power flow continues to the electrical equipment (111).

Further, the amount of current flowing to the electrical equipment (111) is measured near-continuously by the current detection circuit (109) (e.g. up to thousands of times per second). Once power is fully flowing to the load (111), it continues to flow until one of two conditions are met: (1) the current flowing to the electrical equipment (111) falls below the minimum current threshold or (2) the current flowing to the electrical equipment (111) rises higher than a maximum current threshold. If the amount of current flowing to the electrical equipment (111) falls below the minimum current threshold then the device (100) turns off the power flow to the electrical equipment (111) and the cycle of testing for a load is resumed. If the amount of current flowing to the electrical equipment (111) rises above a maximum current threshold, then the device (100) turns off power flow to the electrical equipment (111). The power remains off until power to the device is also turned off. When power to the device (100) is restored, the device (100) will resume the cycle of testing for a load.

In other embodiments of the system, the second time interval runs from zero to a predetermined number of counts of a high speed clock within each power line cycle, where the high speed clock is integrated into the duration circuit (105). Further, the minimum current threshold may be set by the device (100) and the maximum current threshold may be selected by a user via a second control knob (107) comprising a predetermined range of values.

In some embodiments, one or more indicator lamps may alert a user when the device (100) is turned off or on. The indicator lights may further alert the user when power is shut off from the electrical equipment (111) due to an overdraw of current.

Turning now to FIG. 2, an example method 250 for controlling power flow to an electrical equipment using a device of the present system is shown. Herein, the electrical equipment may be one non-limiting example of the electrical equipment (111) described in FIG. 1, and the device may be one non-limiting example of the device (100) shown in FIG. 1. Instructions for carrying out method 250 may be executed by a controller (such as microcontroller 101 of device 100 shown in FIG. 1) based on instructions stored on a memory of the controller.

At 200, the device plugs into an AC power source. At 201, the device allows power to flow from the AC power source to the output receptacle during set intervals. More specifically, load detection is performed at the set intervals. As an example, after the device allows the power to flow from the AC source to the electrical equipment through the device, a current flowing to the electrical equipment is measured using a current detection circuit (such as the current detection circuit 109 of FIG. 1). If the current measured by the current detection circuit is greater than a threshold current, then a load is detected. In one example, the threshold may be a minimum current that is drawn by the electrical equipment when it is turned on. Method 250 proceeds to 202. In one example, the minimum current may be in the milliamp range (0.001 amp, for example).

At 202, method 250 includes determining if load is detected. For example, if the current flowing to the electrical equipment is higher than the minimum threshold then load is detected (e.g., "YES" at 202) and accordingly, method 250 proceeds to 203. However, if the current flowing to the electrical equipment is lower than the minimum threshold, then load is not detected (e.g., "NO" at 202), and the method returns to 201, where load detection test is performed again at the next interval or next cycle. Herein, the load detection of step 201 is performed at set intervals. In some example embodiments, when no load is detected, the power flow to the electrical equipment may be turned off by the device for a certain time and then turned back on and the load detection is performed again.

At 203, the controller of the device slowly ramps up the power (from zero to fully on) to the electrical equipment or load over a user designated time period. Herein, the user designated time period may be set by a user via an adjustable knob (such as the adjustable control knob 107 of FIG. 1). By adjusting the control knob to vary the user designated time period, the user may be able to adjust the ramp rate. As an example, decreasing the user designated time period may increase the ramp rate and increasing the time period may decrease the ramp rate. In this way, the device controls the rate of power delivery to the electrical equipment. By gradually increasing the power delivered to the electrical equipment over the user defined time period, inrush current is eliminated.

Next, at 204, the device disables itself and allows full power to flow directly to the electrical equipment or load. Herein, the power flows directly from the AC source to the electrical equipment. Even after disabling the device, the controller continues to monitor the current that is flowing into the electrical equipment. If the current flowing to the electrical equipment rises above a maximum threshold at 206, the device turns off the power to the load. In one example, the maximum threshold may be set based on the components of the electrical equipment, and/or a maximum current rating of the components of the electrical equipment and/or voltage/current rating of the device. In one non-limiting example, the maximum threshold may be 0.5 amp. In a second non-limiting example, the maximum threshold may be 5 amps. In some examples, the maximum threshold may be value published, stated on the connected device, or actual measured performance. As such, if the current exceeds the maximum current rating, then the components of the electrical equipment may be damaged. In this way, by turning off the power to the electrical equipment when the current rises above the maximum threshold, damage to the components and the electrical equipment is reduced. In some example embodiments, the device may indicate a warning that an overdraw of current is detected at 211. This feature may be an early warning, indicating a need for technical repair before irrevocable damage is done to the components of the electrical equipment. Method returns to 201 to intermittently check for load.

At 205, if the current falls below the minimum threshold, then the controller may infer that the electrical equipment may be turned off, and accordingly, turn off the power delivered to the electrical equipment at 209 and method 250 returns to 201 to intermittently check for load.

If the current flowing to the electrical equipment does not fall below the minimum threshold and does not rise above the maximum threshold, the device allows full power to flow directly to the electrical equipment or load at 208, and method 250 ends.

Turning now to FIG. 4, an example operation 400 of a device operatively connected to an electrical equipment is shown. Specifically, the device is operated to eliminate an inrush current flowing into the electrical equipment when the electrical equipment is turned on. Herein, the device may be one non-limiting example of device (100) and the electrical equipment may be one non-limiting example of the electrical equipment (111) shown in FIG. 1. Example operation 400 shows parameters as a function of time on the x-axis, with the parameters time-aligned such that the same time instances are shown as vertically aligned (e.g., t1). The graphs show the following parameters, starting with the top graph: test for load (plot 402), current flowing from the device to the electrical equipment (measured by a current detection circuit such as the current detection circuit (109) shown in FIG. 1) indicated by plot 404, and power from an AC source to the electrical equipment (plot 408).

At time t0, both the device and the electrical equipment are off. At time t1, the device is turned on. Between time t1 and t2, the device synchronizes its operation to the line rate of the AC power source (e.g., 50 or 60 Hz). At time t2, the device begins testing for load or electrical equipment. Between time t2 and t4, the test for load is on. The time interval between t2 and t4 may be referred to as a first time interval. In some example embodiments, the first time interval may be a fixed time interval (e.g., 1.5 seconds). When the test for load is on (plot 402) at time t2 the device measures the current flowing from the device to the equipment (plot 404). The current flowing from the device to the equipment (plot 404) continues to increase and approaches a first threshold (410). Herein, the first threshold (410) may be a minimum current that determines if the electrical equipment is on.

Between time t2 and t3, the current (plot 404) remains below the first threshold (410), and as a result, the device does not detect the load or electrical equipment. Consequent to the load not being detected between time t2 and t3, the power flow (plot 408) to the electrical equipment is shut off. However, at time t3, the current (plot 404) rises above rises above the first threshold (410). Thus, at time t3, the device detects the electrical equipment and accordingly, the power flow to the electrical equipment (plot 408) is turned on. Once the load or electrical equipment is detected at time t3, the test for load (plot 402) may be turned off at time t4.

Even though the test for load (plot 402) is turned off at time t4, the device may still be on and may continue delivering power to the electrical equipment (plot 408) between time t3 and t5. Herein, the power delivered to the electrical equipment may be gradually ramped up. Ramping up the power to the electrical equipment (plot 408) may include increasing the power from a first power level P0 to a second power level P1. Ramping up of power is the rate of increasing voltage and current. The min-max range falls between zero and the maximum voltage available at the line source. In one non-limiting example, the current range may be between zero and the max load of the connected device. Ramping is the increase of duty cycle from zero to 100% of the voltage and current. In this way, the device provides a steady increase in power flow to the electrical equipment, thus eliminating an inrush current. As an example, the user may adjust a knob on the device to set the second time interval. By adjusting the second interval time, the user may adjust the slope of plot 408, or adjust the rate of power flow, for example. It may be noted that the first interval may be a fixed time interval set by the device and the second time interval may be an adjustable time interval selected by a user via a control knob of the device, for example. As an example, P0 may be zero and P1 may be a maximum power required by the electrical equipment. Ramping up the power to the electrical equipment may include adjusting a rate of power flow from the AC source to the electrical equipment based on one or more of the second time interval, the first power level, and the second power level. In one example, the user may adjust the time interval which affects the pre-programmed rate of power flow. The shorter the time interval is set the steeper the power flow profile becomes. Since the minimum time set (about 1 second) is longer than an instantaneous turn on, inrush current will be limited or eliminated. As such, the rate of power flow will be given by the slope of plot 408 determined during the second time interval which can be written as (P1−P0)/(t4−t3). In one example, when P1=0, the slope of plot 408 becomes P1/(t4−t3), where (t4−t3) is the second time interval. If (t4−t3) is decreased, then the slope of plot 408 is increased, and similarly, when (t4−t3) is increased, the slope of plot 408 is increased. As an example, when the user specifies a second time interval that is shorter than a threshold (e.g., threshold may be determined based on one or more of P0, P1, and (t4−t3)), then rate of power flow is increased, meaning the slope of plot 408 is increased so that P1 will be delivered to the electrical equipment within the shorter time interval. Likewise, if the user specifies a second time interval that is longer than the threshold, then the rate of power flow in decreased. Thus, the rate of power flow is adjusted so that the maximum power is delivered to the electrical equipment within the specified second time interval.

In some example embodiments, the device may be disabled the desired power Pr is delivered to the electrical equipment. In such example embodiments, the device may be turned off at time t4, however power flow may continue to flow directly from the power source to the electrical equipment.

It may be noted that even though the device is turned off at time t4, the power delivery to the electrical equipment from the AC source is uninterrupted between time t4 and t7. Additionally, the current flowing from the AC source to the equipment is monitored continuously. Under some conditions, the device may turn off the power to the device. In one example, at time t7, the current flowing from the device to the electrical equipment rises above a second threshold (412) as shown by plot 406. In such an example, the device turns off power to the electrical equipment (plot 408) at time t7. Herein, the second threshold may be a maximum current threshold, and the power to the electrical equipment may be turned off to reduce any damage to the components of the electrical equipment. In another example, if the current flowing from the device to the electrical equipment (plot 407) falls below the first threshold (410), the device may turn off the power to the electrical equipment (plot 408). For example, the electrical equipment may be turned off at time t7 resulting in the current (plot 407) falling below the first threshold (plot 410). Thus, the device detects that the electrical equipment is turned off, and hence, at time t7, the device turns off power delivered to the electrical equipment. In some example embodiments, the power to the electrical equipment remains turned off until a power to the device is turned on. For example, at time t8, the device may be turned on (plot 402). Once the device is turned on, the load detection is resumed at time t8. Thus, the device may begin another cycle of testing at time t8. Herein, the device may turn on the test for load (plot 402) at time t8, and begin another cycle of testing for load, as described previously. In this way, the device may intermittently start the load testing to determine if the electrical equipment has been turned on, for example. Thus, the cycle of testing for load and adjusting power to the electrical equipment is performed to slowly ramp up the power delivered to the equipment once it is turned on. In this way, inrush currents flowing into the electrical equipment may be reduced.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system for controlling a power flow to an electrical equipment (111) for effective elimination of an inrush current when the electrical equipment (111) is initially turned on, the system comprising:
   (a) a device (100) comprising:
      (i) a microcontroller (101) configured to send a signal to turn off or turn on the power flow to the electrical equipment (111) via a solid state relay (103);
      (ii) a duration circuit (105) integrated into the microcontroller (101) for device (100) timing regulation;
      (iii) a control knob (107) designating a time period over which the device (100) ramps up the power flow to the electrical equipment (111) from zero to fully on, wherein the control knob (107) is operatively connected to the microcontroller (101), wherein the time period is regulated by the duration circuit (105); and
   (b) a current detection circuit (109) operatively connected to the microcontroller (101), wherein a measurement of a current flowing from the device (100) to the electrical equipment (111) is acquired by the current detection circuit (109),
   wherein the device (100) plugs into an AC power source (113), wherein the device (100) is operatively connected to the electrical equipment (111) via an output receptacle, wherein the electrical equipment (111) is powered on after the device (100) is powered on, wherein the device (100) then tests for a presence of the electrical equipment (111), wherein testing for the electrical equipment (111) is done within a first time interval, wherein the microcontroller (101) sends a signal to the solid state relay (103) to allow power to flow from the AC power source (113) through the device (100) to the electrical equipment (111), wherein an amount of current flowing to the electrical equipment (111) is measured via the current detection circuit (109), wherein if the measured amount of current is above a minimum current threshold, then the device (100) has detected the electrical equipment (111), wherein if the measured current is below the minimum current threshold then the electrical equipment (111) is not present or is manually powered off, wherein if the electrical equipment (111) is not detected, the power flow to the electrical equipment (111) is shut off by the device (100) for a time length equal to the first time interval, wherein afterwards, power flow to the electrical device is again allowed for a period of time equal to the first time interval and testing for the presence of the electrical equipment (111) occurs again thus a cycle of testing for the presence of the electrical equipment (111) by the device (100) is established, wherein the first time interval is regulated by the duration circuit (105), wherein once the electrical equipment (111) is detected, the cycle of testing is suspended and the device (100) ramps up the power flow from the AC power source (113) to the electrical equipment (111) over a second time interval set by the control knob (107), wherein the power flow to the electrical equipment (111) ramps up from zero to fully on in gradually increasing increments during the second time interval thereby providing a steady increase in the power flow to the electrical device (100) and eliminating an occurrence of inrush current, wherein once the power flow from the AC power source (113) is fully supplied to the electrical equipment (111), the microcontroller (101) disables the device (100) and the power flow continues to the electrical equipment (111), wherein the amount of current flowing to the electrical equipment (111) is measured near-continuously by the current detection circuit (109), wherein once the power flow from the AC power source (113) is fully supplied to the electrical equipment (111), if the amount of current flowing to the electrical equipment (111) falls below the minimum current threshold then the device (100) turns off the power flow to the electrical equipment (111) and the cycle of testing is resumed, wherein if the amount of current flowing to the electrical equipment (111) rises above a maximum current threshold then the device (100) turns off power flow to the electrical equipment (111), wherein power to the electrical equipment (111) remains off until power to the device (100) is turned off, wherein when power to the device is restored, the device begins the cycle of testing for the presence of the electrical equipment.

2. The system of claim 1, wherein the second time interval runs from zero to a predetermined number of counts of a high speed clock within each power line cycle, wherein the high speed clock is integrated into the duration circuit (105).

3. The system of claim 1, wherein the minimum current threshold is set by the device (100) and the maximum current threshold is selected by a user via a second control knob (107).

4. The system of claim 3, wherein the second control knob (107) comprises a set range of values for the maximum current threshold.

5. The system of claim 1, wherein one or more indicator lamps alerts a user when the device (100) is turned off or on.

6. The system of claim 5, wherein the one or more indicator lamps further alerts the user when power is shut off from the electrical equipment (111) by the device (100) due to an overdraw of current.

7. A method of a device (100) for controlling a power flow to an electrical equipment (111), comprising:
during a first interval, performing a load detection test (402) by monitoring a current flowing from the device to the electrical equipment (404); and
in response to the current (404) rising above a first threshold current (410),
infer that the electrical equipment is turned on;
ramp up the power flow (408) from an AC source to the electrical equipment during a second interval; and
upon completion of the second interval, disabling the device and allowing threshold power to flow directly from the AC source to the electrical equipment.

8. The method of claim 7, wherein the ramping includes increasing the power flow (408) from the AC source to the equipment by adjusting an output of a solid state relay (103) coupled to the device.

9. The method of claim 7, comprising continuing to allow the threshold power to flow directly from the AC source to the electrical equipment until the current (407) flowing from the device to the electrical equipment either falls below the first threshold current (410) or rises above a second, higher threshold current (412), and thereafter turning off the power flow to the electrical equipment.

10. The method of claim 9, further comprising maintaining the power flow to the electrical equipment turned off until a power to the device is turned off.

11. The method of claim 10, comprising resuming performing the load detection test (402) detecting the load when the power to the device is restored.

12. The method of claim 9, comprising adjusting the first threshold current (410) and the second threshold current (412) based on components of the electrical equipment.

13. The method of claim 7, wherein the first interval is a fixed time interval set by the device and the second time interval is an adjustable time interval selected by a user via a control knob (107) of the device (100).

14. A method of a device (100) for controlling a power delivered to a load (111), comprising:
during a cycle of testing (402) for the load, monitor a current flow (404) from the device to the load;
based on the current (404) rising above a first threshold current (410), adjust the power delivered to the load from a first power level (P0) to a second power level (P1) over a time interval, the time interval specified by a user; and
once the power reaches the second power level, allow power to flow directly from an AC source to the load.

15. The method of claim 14, comprising performing the cycle of testing for the load by sending a signal to a solid state relay (103) of the device to allow power to flow from the AC source through the device to the load and measuring the current flow (404) from the device to the load using a current detection circuit (109) of the device (100).

16. The method of claim 14, further comprising based on the current rising above the first threshold current (410), detecting the load, and thereafter suspending the cycle of testing.

17. The method of claim 14, wherein adjusting the power delivered to the load includes increasing power flow from the AC source to the load to a higher rate when the time interval is shorter than a threshold and decreasing the power flow from the AC source to the load at a lower rate when the time interval is longer than the threshold, the threshold based on one or more of the first power level, the second power level, and the time interval.

18. The method of claim 14, wherein allowing the power to flow directly from the AC source to the load includes disabling the device while continuing to monitor the current flowing from the AC source to the load.

19. The method of claim 14, comprising in response to the current (407) flowing to the load falling below the first threshold current (410), turning off the power delivered from the AC source to the load, and resuming the cycle of testing for the load when the device is enabled.

20. The method of claim 14, comprising in response to the current (406) flowing to the load rising above a second, higher threshold current (412), turning off the power delivered to the load and resuming the cycle of testing for the load when the device is enabled.

\* \* \* \* \*